United States Patent Office 3,293,726
Patented Dec. 27, 1966

3,293,726
ELECTROLYTIC CAPACITORS
Ronald John Everitt, East Cote, England, assignor to Cornell-Dubilier Electric Corporation, a corporation of Delaware
No Drawing. Filed Oct. 10, 1963, Ser. No. 315,364
9 Claims. (Cl. 29—25.31)

This invention relates to an electrolytic capacitor, and more especially to a method of producing such a capacitor.

In an electrolytic capacitor, the dielectric layer is constituted by an oxidized layer on the surface of either one or both of these electrodes, such electrodes being made of a so-called valve metal such as aluminum or tantalum or titanium or zirconium.

The production of the dielectric layer is commonly effected by a process of anodic oxidation using a suitable electrolyte. The usual practice is to effect such anodic oxidation process in a continuous manner by passing a substantially continuous length of electrode foil strip through a bath containing the electrolyte and an electrically positive electrode system.

The electrolytic capacitor is then usually produced by winding processed electrode foil strips into a roll with one or more separating strips, and sealing the wound capacitor element thus formed, together with an electrolyte, in a suitable container. The disadvantage of this process, especially in the case of subminiature capacitors, is that the anodic layer can easily be damaged during handling of the electrode foil, so that when the capacitor is in use, a considerable quantity of hydrogen may be generated by electrolytic action due to the imperfections in such layer. This generated hydrogen gas both reduces the efficiency of the capacitor and shortens its useful life.

The object of the present invention is to provide an improved method of producing an electrolytic capacitor whereby the disadvantage above-mentioned is substantially avoided.

According to this invention, a capacitor element for an electrolytic capacitor, before formation of the dielectric layer on either one or both of the electrodes, is inserted together with an electrolyte in a capacitor container, terminal elements projecting from the container are connected within such container to the electrodes of the capacitor element, the container is completely sealed, and the formation of the dielectric layer is effected by anodic oxidation, a chemically reducible compound being incorporated with the container to absorb the hydrogen gas generated during such electrolytic oxidation process.

The hydrogen absorbent may be incorporated in a variety of ways. For example, it may be incorporated as a solute in the electrolyte, preferably in saturated solution. Alternatively, when the capacitor element is of the kind rolled from conducting foil strips with one or more absorbent separating strips, the hydrogen absorbent may be incorporated as an impregnant in such separating strip or strips. When the foil strips are secured before winding to the separating strip or strips by means of an adhesive, the hydrogen absorbent may be incorporated as a dispersion in such adhesive. Yet again, the hydrogen absorbent may be incorporated in the capacitor element as a reducible coating or film on either one or both of the electrodes.

The provision in an electrolytic capacitor of an especially useful hydrogen absorbent forms the subject of the present applicant's concurrent British patent application No. 38,856 of 1962, such hydrogen absorbent being constituted by an organic compound having as part of its structure one or more oxime groups, for example quinone dioxime. While various other reducible compounds are useful for the purpose of carrying out the method according to the present invention, an organic oxime compound is especially suitable since it has been found that a relatively small quantity of such compound will absorb a large quantity of hydrogen, and that the products of the reduction process in no way adversely affect the working of the capacitor.

A further advantage of the method according to the present invention is that electrolytic capacitors can be produced in an unformed condition, that is with manufacture completed except for the formation of the dielectric layers, and stored in a sealed condition for long periods, subsequently forming such dielectric layers by anodic oxidation, to produce capacitors of the specific capacitance value required, only when the capacitors are required for use.

A practical method of producing an electrolytic capacitor within the scope of the invention will now be described by way of example.

In this method, which is especially suited to the production of a sub-miniature electrolytic capacitor, a capacitor element of the rolled kind is first produced by the method described and claimed in the present applicant's British Patent No. 891,327. Thus, in accordance with this method, the capacitor electrodes are wound from two lengths of aluminum foil strip with a separator constituted by absorbent paper strip. The two conducting strips, with terminal posts attached, are secured in non-overlapping relationship respectively to opposite faces of the paper strip by means of an adhesive, being positioned so that one terminal post is near one end of the paper strip and the other near the center of the length thereof. The assembly of strips is then wound into a roll by rotating the terminal post located near the center of the paper strip, thereby first folding the assembly and then winding such folded assembly into a roll. In contrast with the preferred method described in the above-mentioned patent specification wherein the required dielectric layer on either one or both electrodes is formed prior to incorporation of the foil strips in the rolled capacitor element, in the present method the rolled capacitor element is produced with the required dielectric layer, at least on one of the electrodes, not yet formed.

The rolled capacitor element produced in the above-described manner is inserted together with an electrolyte in a suitable container open at one end, and terminal wires for the capacitor, which extend through an end closure for the container, are connected within such container to the terminal posts on the capacitor element. The container is then closed and sealed by application of the end closure in any one of the well known ways.

In accordance with the present invention, a quantity of quinone dioxime, or other organic oxime compound, is incorporated in saturated solution in the capacitor electrolyte.

The production of the capacitor is now complete except for the production of the dielectric layer, and may be stored until required for use. The dielectric layer is then produced by anodic oxidation, utilizing the capacitor terminal wires to effect the necessary electrical connections for this purpose and the capacitor electrolyte as the medium for electrolysis. The manner in which the oxide layer is thus formed on either or both of the electrodes is the same as that in the usual method wherein anodic oxidation is carried out on the electrode foils before these are wound into a capacitor element. However, whereas in the usual method the generated gases are released into the atmosphere, in the present method these gases are contained within the sealed capacitor container. Both oxygen and hydrogen are generated, but the oxygen is absorbed in oxidation of the electrolyte and the hydrogen is absorbed in reduction of the organic oxime compound. The quantity of electrolyte used up due to oxidation is small and not detrimental to subsequent working of the capacitor, and the products of the reduction process do not adversely affect such working.

On completion of the oxidation process the capacitor is ready for use, and damage to the dielectric layer due to handling of the electrode foils after formation of such layer is avoided. Thus, release of hydrogen by electrolytic action due to imperfections in such layer, when the capacitor is in use, is minimized, thereby increasing the efficiency of the capacitor and extending its working life. It should be mentioned also that the relatively small quantity of hydrogen which may be released during subsequent working will be absorbed by the remaining amount of reducible compound in the capacitor.

Various reducible compounds other than an organic oxime compound may be incorporated to act as the hydrogen absorbent. Examples of these compounds are organic compounds having nitro or azo or quinone groups and inorganic compounds such as ferric chloride and potassium permanganate. These compounds may be incorporated as solutes in the electrolyte, preferably in saturated solution. It is alternatively possible however to incorporate the reducible compound in the capacitor in other ways. For example a solution of quinone dioxime or other suitable compound may be incorporated as an impregnant in the separating strip of which the rolled capacitor element is wound. Again, a dispersion of quinone dioxime powder may be coated on the electrode foils prior to winding thereof, or any other suitable reducible film or coating may be applied to such foils. Finally, the quinone dioxime or other organic oxime compound or other suitable reducible compound may be incorporated as a dispersion in the adhesive used to secure the foil strips to the separating strip before winding. Suitable adhesives also for acting as a carrier for the reducible compound may be prepared for example from gelatine or agar or methyl cellulose.

Various modified methods of producing an electrolytic capacitor are possible within the scope of the invention, and in particular it is to be noted that the invention is limited neither to the production of sub-miniature capacitors nor to the production of capacitors incorporating rolled capacitor elements.

What I claim is:

1. A method of producing an electrolytic capacitor including the steps of assembling a capacitor element including a pair of electrodes exposed to an electrolyte within a container before a dielectric layer is formed on one of the electrodes and a chemically reducible compound, sealing the container, and subsequently forming a dielectric layer on at least one of said electrodes by anodic oxidation, said chemically reducible compound absorbing the hydrogen gas generated within said sealed container during said anodic oxidation process.

2. A method of producing an electrolytic capacitor according to claim 1, including the step of combining the hydrogen absorbent as a solute in the electrolyte.

3. A method of producing an electrolytic capacitor according to claim 1 including the steps of convolutely winding the capacitor element which includes a pair of conducting foil strips as electrodes interleaved with absorbent separating strips.

4. A method of producing an electrolytic capacitor according to claim 3 in which the hydrogen absorbent is incorporated as an impregnant in the interleaved absorbent separating strips.

5. A method of producing an electrolytic capacitor according to claim 1 including the steps of convolutely winding a capacitor element from conducting foil strips interleaved with absorbent separating strips, applying an adhesive to said wound capacitor element to prevent unwinding, said adhesive including the hydrogen absorbent as a dispersion in said adhesive.

6. A method of producing an electrolytic capacitor according to claim 1 in which the hydrogen absorbent is incorporated in a capacitor element as a reducible coating on either one or both electrodes of the capacitor element.

7. A method of producing an electrolytic capacitor according to claim 1 in which the hydrogen absorbent is constituted by an organic compound having as a part of its structure one or more oxime groups.

8. A method of producing an electrolytic capacitor according to claim 7 in which the hydrogen absorbent is constituted by quinone dioxime.

9. A method of producing an electrolytic capacitor including the steps of assembling a capacitor element from a pair of electrodes before formation of a dielectric layer on either one or both of the electrodes, together with chemically reducible compound; inserting the capacitor element together with an electrolyte in a capacitor container, said capacitor container having terminal elements projecting therefrom that are connected within the container to the electrodes of the capacitor element; sealing the container completely; and forming a dielectric layer by anodic oxidation on an electrode of said capacitor element, said chemically reducible compound absorbing the hydrogen gas generated within said sealed container during said electrolytic oxidation process.

References Cited by the Examiner

UNITED STATES PATENTS

| | | | |
|---|---|---|---|
| 2,616,953 | 11/1952 | Booe | 29—25.31 X |
| 2,870,236 | 1/1959 | Heininger | 317—258 X |
| 3,072,831 | 1/1963 | Kurland | 317—242 X |

JOHN F. CAMPBELL, *Primary Examiner.*

WHITMORE A. WILTZ, WILLIAM I. BROOKS,
*Examiners.*